INVENTOR
Walter O. Whiteley
BY
ATTORNEY

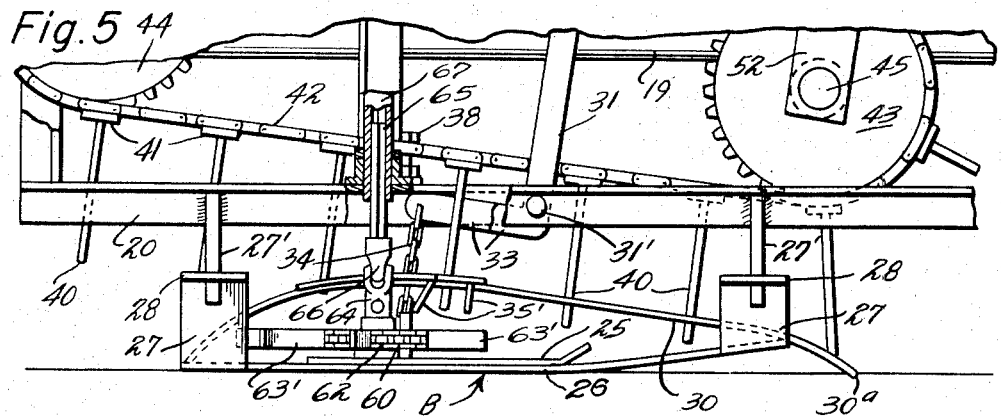
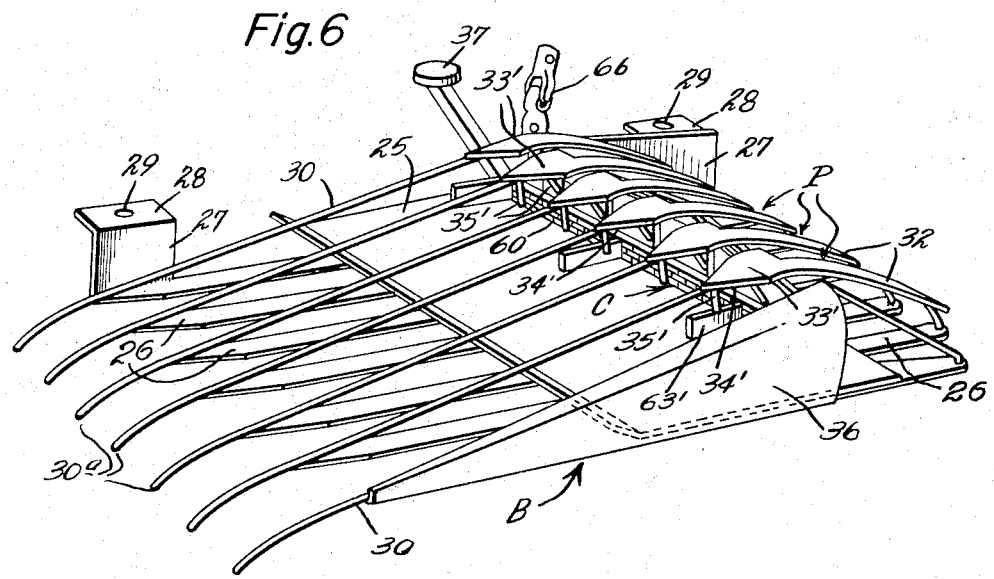

United States Patent Office 3,365,869
Patented Jan. 30, 1968

3,365,869
CUCUMBER HARVESTER
Walter O. Whiteley, Williamsburg, Md., assignor to W. O. Whiteley & Son, Inc., Williamsburg, Md., a corporation of Maryland
Filed Mar. 15, 1965, Ser. No. 439,617
7 Claims. (Cl. 56—327)

ABSTRACT OF THE DISCLOSURE

A harvesting machine is disclosed having means to elevate cucumber vines, harvesting means to remove the cucumbers from the elevated vines, and resisting or holding means overlying the elevating and harvesting means.

Figure 1:
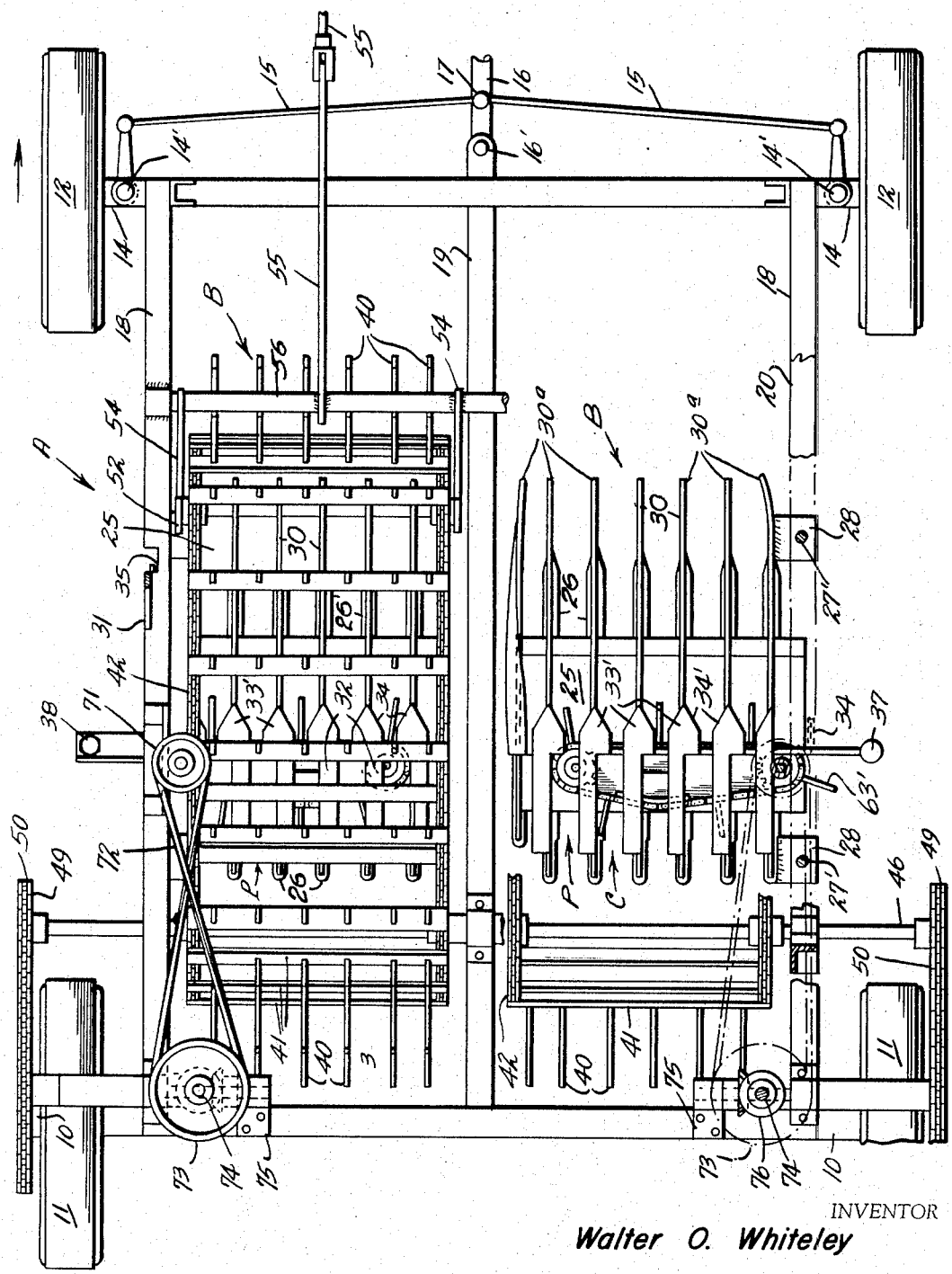

This invention relates to a means and method for harvesting crops such as cucumbers of at least a predetermined size from vines while in growth without uprooting of or injury to the vines, thereby enabling the vines to continue growth with the cucumbers below that predetermined size, small cucumbers, sets and blossoms remaining on the stems of the vines for continued growth and subsequent harvesting one or more times as other cucumbers mature into the desired size.

In the consideration of this specification and unless otherwise stated, it is to be understood that references to vines means while their roots remain planted or are growing in the soil.

A prime object is to provide the means and method whereby the cucumbers are harvested while in a depending position and the vines are spread substantially in their natural growing position.

A second object is to provide for harvesting the cucumbers by means usually dragged or pulled along the ground under the vines and which elevates the vines slightly, so that the cucumbers to be harvested will substantially vertically depend for effective removal from the vines in combination with mechanism moving in the opposite direction to the drag or pull means and which has a multiplicity of locations of engagement with the vines to resist displacement of the vines out of their natural spread condition.

A third object is to provide such a means and method which utilizes at least one harvesting assembly or unit arranged to be drawn over the soil and gently lift the vines a short distance above the soil for the harvesting operation and gently move from under them, all operations being effected without disturbing their roots whereby the vines remain substantially in their normal growing condition and the aims of the invention are attained.

A fourth object is to use as the means and method of the last paragraph two of the said harvesting units exposed to straddle the cucumber vines of a row and pick on both sides to insure picking of all of the proper size cucumbers of the vines being picked.

Another object is to provide for picking or dislodging of the cucumbers from the vines through substantially simultaneous striking contact therewith the parts travelling in one direction against the cucumbers in cooperation with vine-spread maintaining means travelling in the opposed or first direction.

A sixth object is to provide for picking of the cucumbers by one or more relatively low harvesting units which are drawn beneath the vines and so shaped as to elevate them whereby the cucumbers will hang vertically to facilitate forcing off or picking through the motion of oppositely moving means and the vines will return to their original positions on the ground, all without unduly disturbing or injuring the roots of any of the vines.

Further it is aimed to provide a machine or method of the character set forth which has a pair of picking units mounted on a suitable mobile body arranged to straddle a row of cucumber vines, be pulled or drawn under the vines on opposite sides of their centers at a speed equal to the forward movement of the vehicle to lift the vines slightly to enable the cucumbers thereon to hang vertically and by means of picker mechanism in combination with vine-movement resisting elements of reversely moving chains or the equivalent force off or pick cucumbers of at least a predetermined size, permitting the vines thereafter with the small cucumbers, blossoms and sets, to lower or return onto the ground to their original growing position without injury or harm or change to their natural growing position and condition for further growth and picking one or more times, until such remaining cucumbers, sets and blossoms mature.

One more object is to provide a novel means to discharge the harvested cucumbers from the harvesting unit preferably by moving them laterally for disposition or collection in any desired way.

Various additional objects and advantages will be pointed out or become apparent from a consideration of the description following of one embodiment of the invention which is to be taken in connection with the accompanying drawings and is to be considered as but one example only.

Figure 2:
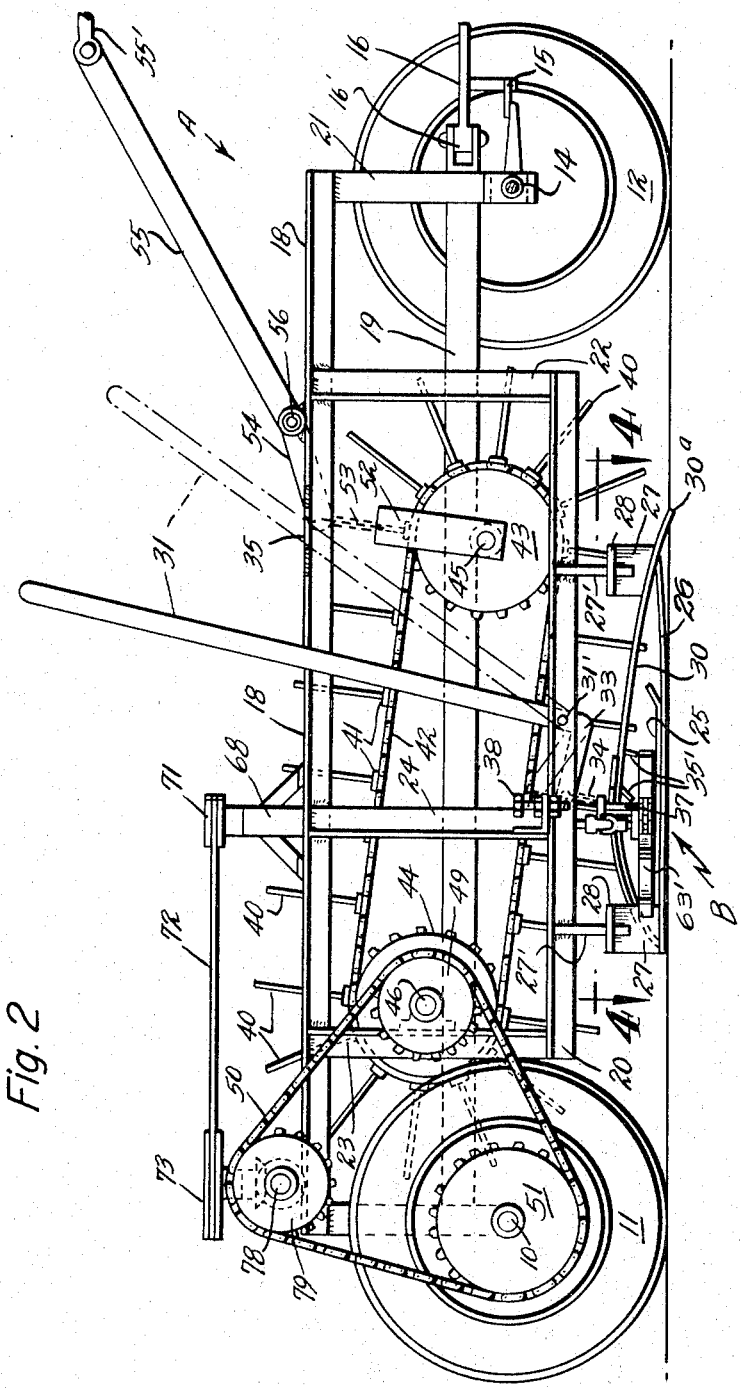
Figure 3:
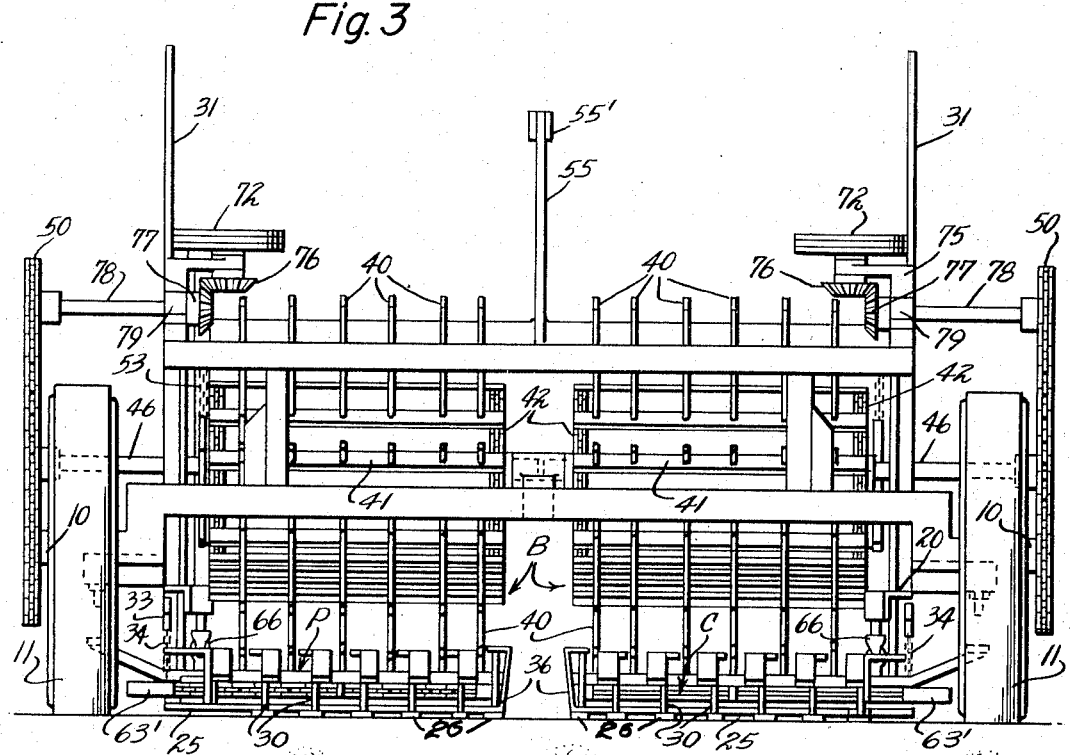
Figure 4:
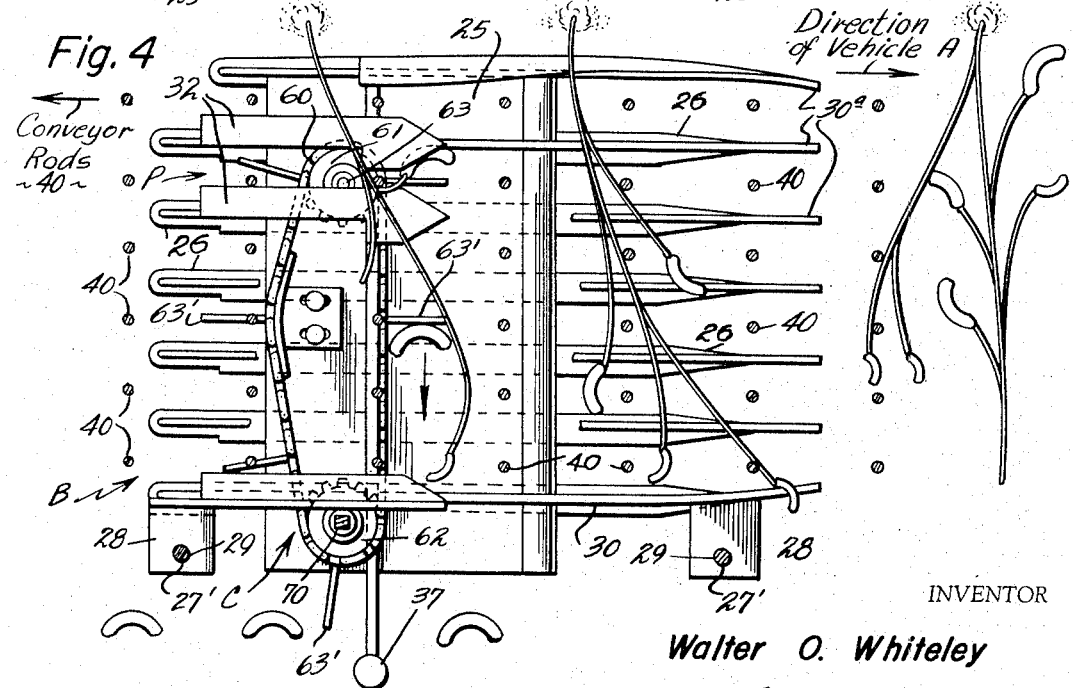

In said drawings:
FIGURE 1 is a top or plan view of the improved machine with the right-hand side of the machine broken away to disclose details;
FIGURE 2 is a side elevation of the machine;
FIGURE 3 is a rear elevation of the machine;
FIGURE 4 is a sectional view taken on the plane of line 4—4 of FIGURE 2;
FIGURE 5 is an enlarged side elevation primarily of one of the harvester units employed; and
FIGURE 6 is a perspective view of one of the harvesting units alone.

Referring specifically to the drawings wherein like reference characters designate like or similar parts throughout the different views, any suitable type of mobile vehicle may be employed as designated A, the body or frame work of the vehicle being, for instance, of skeletonized form using for example metallic bars or angle irons of suitable shape and weight. Journaled at the rear of said body is an axle 10 which is driven by rear ground wheels 11 attached thereto.

At the front of the body or frame work A are wheels 12 journaled on stud axles of knuckles 14 movable on vertical axes at 14', the cranks of the knuckles being connected by rods 15, in turn connected to a draft tongue or the like 16 at 17 and which tongue is pivoted on a vertical axis at 16' to the frame A, the parts mentioned constituting the steering gear for the vehicle.

Associated with the frame work A is one or more harvester units generally designated B.

Each unit B is drawn by the vehicle while resting on the ground or soil and beneath the cucumber vines. Said body or frame work A includes upper longitudinal frame members 18, and intermediate longitudinal frame member 19 below and spaced from the frame members 18 and lowermost frame members 20. Frame members 18 at the front are connected by upright frame members 21 of said framework A and rearwardly thereof upright frame members 22, 23 and intermediate upright frame members 24 connect frame members 20 to the frame members 18, the various frame members being connected rigidly together as by welding, bolting or any equivalent.

Each harvester unit B includes a cucumber collecting pan or bottom member 25 having integral therewith, welded or otherwise attached a plurality of laterally spaced apart runners 26 which rest directly on the ground and which extend both forwardly and rearwardly beyond the bottom 25. Along one side of each harvester unit B is provided a pair of guide members 27 having horizontal flanges 28 provided with openings 29 through which guide rods 27' extend, the latter depending from frame members 20 as well shown in FIGURES 2 and 5. In order to slidably raise and lower harvesting units B along guide rods 27' to and from elevated transport position, a lever 31 is provided and pivoted as at 31' to frame member 20, and having a crank 33 suitably connected by a chain 34 to the bottom 25 of a harvester unit or equivalent part. Any suitable locking means may be employed as at 35 to lock the lever 31 in transport position holding a harvester unit B elevated slightly from the ground. An abutment element 37, which is engageable with a screw-threaded or other adjustable stop 38, is mounted by frame member 20 adjacent frame member 24 as shown in FIGURE 2.

Reverting to each harvester B at the top thereof, are a plurality of longitudinal, laterally spaced-apart rods or tines 30 which are arched or convexly curved or the equivalent from front to rear and which at their front ends 30a may be sufficiently low to slightly pentrate the soil to insure entry beneath the vines and elevation of any stems which may have struck roots into the soil.

At the rear of each harvester unit there is a plurality of picker members 32 which are rigidly fastened in any suitable manner as by welding or otherwise securing them to the highest portions of the tines 30. At the forward ends of the harvester or picker members 32 they have heads 33' which forwardly are pointed so as to provide inclined edges or surfaces 34' which desired cucumbers will abut during harvesting to effect the stripping of the cucumbers between them in the ways or spaces between the tines 30 to fall onto or be collected by the bottom 25. Deflector pins 35' may depend from the heads 33' as shown in FIGURES 5 and 6. Also, at the inner side of each harvester unit B is a side wall 36 fastened to the bottom 25 and adjacent tine 30 or otherwise, which prevents cucumbers collecting on the bottom 25 from falling or discharging at the center of the machine.

It will be particularly noted from FIGURES 1, 4 and 6 for examples that the heads 33' are spaced apart and in fact rearwardly of the heads the harvester members or pickers 32 are spaced apart. By reason of the construction mentioned, cucumbers on vines upheld by the tines 30 will hang vertically and the edges of surfaces 34' will knock or contact the cucumbers of at least a predetermined size to strip them from the vines to fall on the bottom or collector plate 25. It is to be emphasized that the longitudinal spaces between the heads 33' at the rear of the edges 34' of the harvester pickers or strippers 32 provide paths P which will permit passage therethrough of the cucumbers below or smaller than the predetermined size as well as small cucumber sets and blossoms and thus they will not be injured or stripped from the growing vines in order to desirably retain them for further growth to maturity into the desired cucumber size.

While the harvester units B are moving beneath the vines, fingers 40 as will be seen in FIGURE 2 in particular and at the forward end of the tines 30 will penetrate the plane of the vines and move at substantially the same speed as the harvester unit B, and when the resisting or holding fingers 40 are in engagement with the stems of the vines they maintain or hold the vines in substantially their natural growing position somewhat elevated but otherwise prevent displacement of the vines and insure effective harvesting or picking of the cucumbers above the size desired because they cannot pass between the heads 33 and must strike the edges 34'. When fingers 10 are in contact with the vines, their motion is similar and near identical to a portion of a crawler tractor which is in contact with the ground, and therefore they have no noticeable movement. said tines 40 as shown travel in laterally spaced endless paths or ways and longitudinally through the paths or ways between the tines 30 and harvester or stripper members 32. Each lateral row of the tines or fingers 40 is fastened to slats 41 and each harvester unit B has spaced-apart endless chains, belts or the equivalent, to which the ends of said slats 41 are fastened in any desirable manner. Said belts 42 may be sprocket chains trained at the front and rear to sprocket wheels 43 and 44 which are fastened to cross shafts 45 and 46 suitably journaled in bearings on frame member 19 and on bracket 52.

Said shaft 46 has sprocket wheels 49 thereon over which a sprocket chain 50 passes, the same also passing over a driving sprocket wheel 51 fastened to the rear axle 10.

Shaft 45 of each unit is journaled in a suitable bracket 52 (FIGURE 2) which is connected by a chain 53 to a crank 54 of a lever 55, pivoted at 56 on a frame member 18 and operable from any suitable location to raise and lower the sprocket wheels 43 and accordingly the foremost portion of the sprocket chains 42 and fingers 40 thereon, any suitable means such as link rod 55' from the tractor being used if desired to lock the lever 55 in its different vertically adjusted positions.

It will be noted particularly from FIGURES 5 and 6 that the deflectors 35' which depend from the heads 33' of the strippers are so positioned as to direct stripped or picked cucumbers and guide any errant cucumbers or vines as described.

It will be understood, of course, that the parts may be made adjustable in any suitable way to vary the ways or spacing P between the tines 30 and the strippers 32, particularly at the heads 33' thereof.

A suitable discharge conveyor C is provided directly above the bottoms or pans 25 in order to discharge the harvested cucumbers falling onto the bottoms or pans 25 to the outer sides of the machine for gathering or collecting in any suitable manner or by any desired means. The discharge means C of each harvester unit B may consist of a horizontal endless chain 60 which is trained over sprocket wheels 61 and 62, dislodging blades 63' extending laterally from the chains 60 and functioning to wipe the cucumbers from the bottoms 25, as well seen in FIGURE 4. Sprocket wheel 61 is fastened to a short shaft 63 journaled in the bottom or pan 25 and sprocket wheel 62 is fastened to a shaft 64 also journaled in the bottom or pan 25 to the upper end of which shaft 64 a shaft extension 65 is fastened by a flexible or universal joint 66. Extension 65 is square in cross section or the equivalent, and a sleeve 67 is telescoped slidably thereover and also rotatably in a bearing 68 carried by the adjacent frame member 20.

Said sleeve 67 forms part of a drive shaft for the associated conveyor C.

The drive shaft mentioned is designated 70. There are two of the drive shafts 70, of course, one for each of the harvesting units as shown in FIGURE 1. Keyed to each drive shaft 70 is a pulley or sprocket wheel 71, over which a belt or chain 72 traverses. The belt or chain 72 of each harvester unit is also trained over a sprocket or pulley 73 fast on a shaft 74 which is journaled in a bracket 75 mounted on the frame work of the machine. At the lower end, each shaft 74 carries a bevel gear 76 which meshes with a bevel gear 77 carried by a shaft 78 journaled at 79 on the frame work A. At the outer end, each shaft 78 carries a pulley or sprocket 79 over which the aforementioned chain or belt 50 traverses in order to drive the parts mentioned and especially the discharge mechanisms C.

Presuming operation, the machine is pulled over the ground by a tractor or any suitable means, connection being made with the draft tongue 16 and the front wheels 12 preferably being capable of steering. Preferably the machine has two of the cucumber harvesters shown at B. The machine straddles the row of planted and growing cucumbers with the units following a path beneath the vines on opposite sides of the cucumber vines as the machine progresses or travels with the harvester units B passing beneath the vines, the latter are raised and supported on the tines 30, throughout the length of the row but successively at different portions thereof. As the portions of the vines are engaged by the tines 30, at ends 30a, which may even penetrate slightly into the soil, they are lifted by the tines. When the lifting of the vines is initiated, the tines 40 move in the opposite direction to the direction of travel of the harvester units B, penetrating the vines plane which the lifted vines take, thereby adding a multiplicity of points resisting lateral motion or movement of the stems of the vines whereby the vines are temporarily stiffened and rendered immobile at the time cucumbers depending from the vines encounter the heads 33' at the edges 34' of the strippers. The invention harvests only cucumbers above a predetermined size which is governed by the spacing between the strippers 32 at the heads thereof since immature or cucumbers below the predetermined size, the cucumber sets and cucumber blossoms are not removed since the strippers 32 will move past them. As a result, harvesting is effected with the vines substantially in their natural growing position, the same being slightly elevated of course and the smaller cucumbers, sets and blossoms, remaining on the vines to grow into maturity and to be harvested by duplicating the procedure mentioned one or more times, as desired, and dependent on the maturity thereof.

Various changes may be resorted to within the spirit and scope of the invention as defined by the appended claims, and for instance, by constructing the machine so that the vine resisting fingers 40 will follow an annular or circular path rather than an endless path.

What is claimed is:

1. A cucumber harvesting structure having a harvester unit including means to elevate the cucumber vines, harvesting means on said elevating means for removing the cucumbers from said vines, and resisting means for the vines overlying said elevating and harvesting means such that as the vines are elevated and moved toward the harvesting means portions of the resisting means are interspersed among the vines to resist undue lateral and horizontal movement thereof.

2. A cucumber harvester according to claim 1, said unit being generally cambered so as to be greatest in heighth intermediate its forward and rear ends so that said ends will be lower to respectively facilitate initial engagement with the vines and return of the vines to the ground.

3. A cucumber harvester according to claim 1 wherein said elevating means is in the form of longitudinally spaced apart tines providing longitudinal ways in which said cucumbers depend and said harvesting means being mounted on said tines and extending into said ways in order to be engaged, by cucumbers of at least a predetermined size to harvest them.

4. A cucumber harvester according to claim 3 with, said ways to the rear of the latter means being open for the passage of cucumbers smaller than the said predetermined size.

5. A cucumber harvester according to claim 3 wherein said harvesting means consists of elongated members.

6. A cucumber harvester according to claim 1 wherein said resisting means is an endless device and has projecting fingers.

7. A cucumber harvester according to claim 1 in which the harvester unit includes a floor to receive the removed cucumbers, and a device associated with said floor to remove the cucumbers therefrom.

References Cited

UNITED STATES PATENTS

| | | | |
|---|---|---|---|
| 1,560,663 | 11/1925 | Castanie | 56—264 |
| 2,829,484 | 4/1958 | Gilbert | 56—327 |
| 2,893,193 | 7/1959 | Gilbert | 56—327 |
| 3,084,496 | 4/1963 | Leonard et al. | 56—327 |

ANTONIO F. GUIDA, *Primary Examiner.*

ABRAHAM G. STONE, RUSSELL R. KINSEY,
*Examiners.*